July 29, 1958 A. MEYER 2,845,598

PHASE MODULATOR

Filed Aug. 22, 1955

INVENTOR.
ALBERT MEYER

BY

Agent.

United States Patent Office 2,845,598

Patented July 29, 1958

2,845,598

PHASE MODULATOR

Albert Meyer, Cincinnati, Ohio, assignor to The Baldwin Piano Company, Cincinnati, Ohio, a corporation of Ohio Application August 22, 1955, Serial No. 529,618

10 Claims. (Cl. 332—23)

The present invention relates generally to systems of phase modulation and more particularly to systems of phase modulation employing an electronically variable capacitance as an element of a phase modulating bridge circuit.

It is known that a signal source, balanced to ground, may be connected across a condenser and resistance in series, the voltage existing between ground and the junction of the resistance and condenser remaining constant in amplitude and varying in phase as the relative values of resistance and capacitance are varied. The described bridge circuit is difficult to incorporate in an electronic phase modulator, because neither the resistance nor the capacitance has a ground terminal. The circuit may be modified to provide a ground at one terminal of the capacitor, provided the balanced signal source center tap is not grounded. In the latter case the capacitor may conveniently be of the electronically variable type, and more particularly may be a Miller-effect capacitor. The output terminals may remain the same as in the first described circuit, but neither output terminal is then at ground potential. Since the potential difference between the output terminals represents the desired phase modulated output, a balanced differential amplifier may be connected to the output terminals, and the final signal output derived from the differential amplifier in single ended relation.

Miller-effect capacity is provided by a suitably connected pentode tube circuit, the input capacity of which may be varied smoothly and over a large range in response to modulating signal applied either to the suppressor grid or to the cathode of the Miller-effect pentode tube. In the latter case the cathode potential of the Miller effect pentode tube may be varied by a cathode follower stage which has a cathode resistance in common with the pentode tube.

The phase shift bridge employed in the practice of the present invention provides an output of constant amplitude, during phase shift, which is desirable in producing vibrato effects in electronic musical instruments. Various improvements in circuitry have been provided, in accordance with the invention, to assure production of phase shifts which follow a modulating signal smoothly and without abrupt shifts of phase, and thereby provide pure vibrato effects, of particularly pleasing character.

It is, accordingly, a broad object of the present invention to provide a novel electronic phase control system.

It is another object of the present invention to provide a system of phase modulation which produces a phase modulated signal of constant amplitude in response to a modulating voltage.

Another object of my invention resides in the provision of a phase shift circuit employing a bridge circuit, one arm of the bridge circuit including a Miller-effect capacitor.

A further object of the present invention resides in the provision of an electronic phase modulator, in which a relative phase displacement of voltages is caused to occur in two arms of a bridge circuit, and in which a phase variable voltage of constant amplitude is produceable in a single ended output circuit by differentially combining the phase displaced voltages.

The above and still further features, objects, and advantages of the present invention will become apparent upon consideration of the following detailed description of a specific embodiment of the invention, especially when taken in conjunction with the accompanying drawings, wherein.

Figure 1:
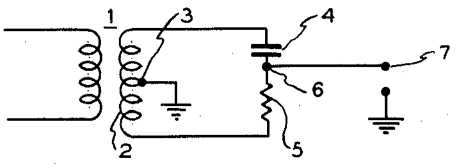
Figure 1 is a schematic circuit diagram of a phase modulator bridge circuit, which is known in the prior art.

Referring now more particularly to Figure 1 of the accompanying drawings, the reference numeral 1 denotes a signal input transformer, the secondary winding 2 of which has a grounded center tap, 3. Connected across the secondary winding 2 is a capacitor 4 of capacitance C and a resistance 5 of value R, in series. The junction 6 of the capacitor 4 and resistance 5 is connected to an output terminal 7. The phase of voltage at terminal 7, with respect to input voltage to the transformer, or with respect to ground, may be varied without accompanying amplitude variations, by varying the relative values of C and R. In particular, it is desired to substitute for capacitor 4 a Miller-effect voltage responsive capacitor, to enable signal-responsive phase modulation. However, capacitor 4 does not possess a grounded terminal, which makes difficult the substitution of electronic circuitry for the capacitor 4.

Figure 2:
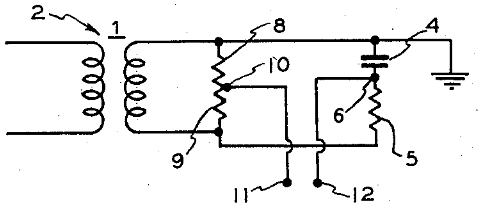
Figure 2 is a schematic diagram of a modification of the system of Figure 1, in which a ground point is selected in a phase modulator bridge circuit, such that electronic circuitry may be conveniently associated with the bridge circuit for the purpose of electronic phase modulation of an input signal of constant phase.

In the system of Figure 2 a resistance type voltage divider, consisting of resistances 8, 9, in series, is connected across secondary winding 2. The common terminal 10 of resistances 8, 9 is connected to an output terminal 11. The junction 6 of capacitor 4 and resistor 5 is connected to a further output terminal 12. The junction of capacitor 4 and resistance 8 is grounded.

The difference of potential at terminals 11 and 12 now is phase variable as the capacitance of capacitor 4 is varied. In contradistinction to the circuit of Figure 1, a Miller-effect capacitor may be conveniently substituted for capacitor 4 in the system of Figure 2, since in the latter circuit capacitor 4 possesses a grounded terminal. The difference of potentials at terminals 11 and 12 may be derived by means of a differential amplifier, which provides a single ended output. In the alternative input signal may be applied at terminals 11, 12, and output potentials derived across resistors 8, 9, which are phase modulated as capacitor 4 is varied.

Figure 3:
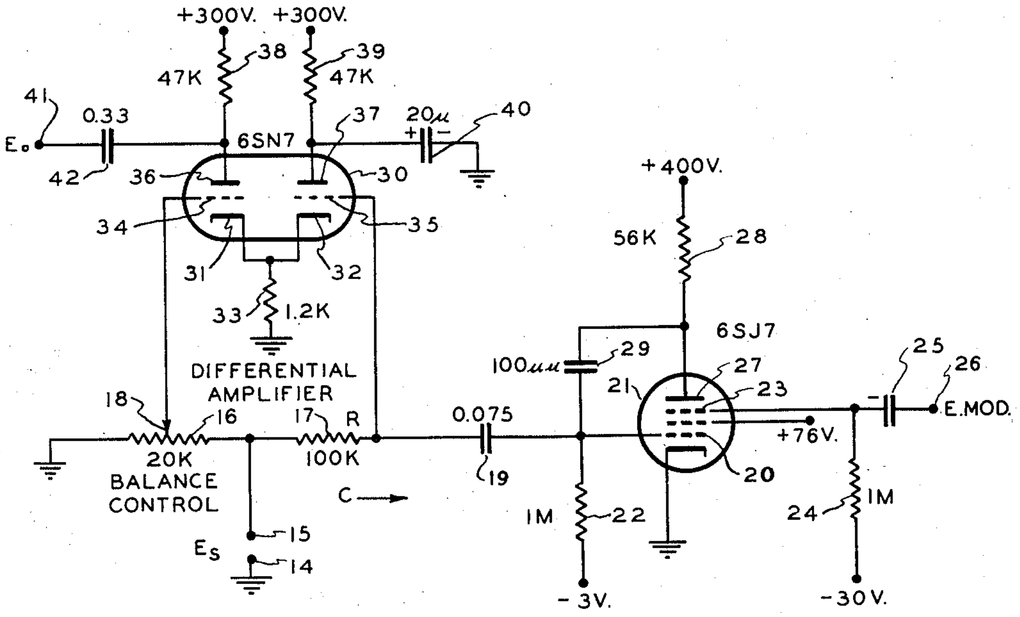
Figure 3 is a schematic circuit diagram of a phase modulator arranged in accordance with the invention.

In Figure 3 of the accompanying drawings is illustrated a phase modulation circuit in accordance with the present invention, which is based on the circuit of Figure 2 of the accompanying drawings. Signal derived from a suitable source is applied to terminals 14, 15, one of which, 14 is grounded. The ungrounded terminal 15 is applied to the junction of resistances 16 and 17. Resistance 16 is grounded at one end and provided with a variable tap 18. Resistance 17 may be fixed.

The resistance 17 is connected via a D. C. isolating condenser 19 to the control grid 20 of a pentode 21. Bias voltage is applied to control grid 20 in series with a resistance 22, in the usual manner. The screen grid of pentode 21 is operated at fixed voltage, while the suppressor grid 23 is utilized as a modulating element, being biased negatively through a resistance 24, and coupled through a coupling condenser 25 to a terminal 26, at which A. C. modulating signal may be applied.

The anode 27 of the pentode 21 is loaded by a resistance 28, and is connected to the control grid 20 through a condenser 29. The pentode then presents, on proper selection of operating and circuit parameters, a capacitance at its control electrode 20 which varies as the gain of the pentode. This capacitance is commonly known as a Miller-effect capacitance. The gain is varied by varying the voltage at the suppressor grid 23, so that the input capacity of the Miller-effect pentode is variable as a function of modulating voltage at terminal 26.

As the capacity presented at the input circuit of pentode 21 varies, the phase of the current flowing in resistance 17 likewise varies, and the voltage across resistance 17 is therefore a function of the modulating voltage applied at terminal 26.

The phase of voltage across resistance 16 remains equal to that of the input voltage at terminal 15. The difference of voltages appearing across resistances 16, 17 is therefore phase variable in response to modulating signal at terminal 26.

In order to derive a single ended output circuit representative of the phase difference between the voltages appearing across resistances 16 and 17, I utilize a differential amplifier. The latter employs a twin triode tube 30, the cathodes 31, 32 of which are commonly connected to ground via a resistance 33. The grids 34, 35 of the twin triode 30 are connected respectively to the variable tap 18 of resistance 16, and to the junction of resistance 17 and capacitor 19. The variable tap 18 permits adjustment of the voltage applied to grid 34 so as to accomplish constant output voltage with varying phase shift. The anodes 36, 37 of twin triode 30 are separately loaded by equal resistances 38, 39. The anode 37 is coupled to ground for A. C. voltage, by means of a condenser 40, thereby reducing the input capacitance at grid 35 so as to achieve the greatest ratio of maximum to minimum Miller capacitance. An output terminal 41 is coupled to anode 36 via a coupling and isolating capacitor 42.

In operation the left hand section of twin triode 30 is driven by the right hand section through the common cathode resistance 33, and in phase relationship shifted with respect to the drive at grid 34, whereby the output voltage at anode 36 is proportional to the vector difference of the voltages at the grids 34, 35, respectively.

It has been found in practice that application of a negative bias of between 20 and 30 volts to suppressor grid 23 increases the smoothness of response to an input signal, and avoids the production of abrupt shifts in phase.

In the system of Figure 3 of the accompanying drawings, the Miller effect capacity pentode is suppressor grid modulated. In accordance with a further modification of my invention, illustrated in Figure 4 of the accompanying drawings, the Miller effect pentode is cathode modulated by means of a cathode follower circuit.

Figure 4:
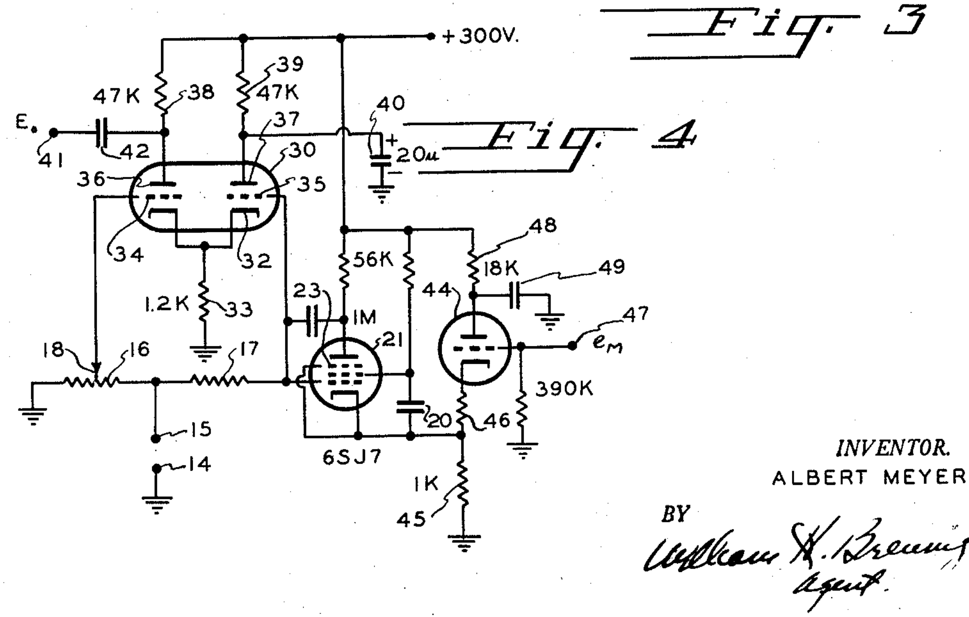
Figure 4 is a circuit diagram of a modification of the system of Figure 3.

Identical elements of the circuits of Figures 3 and 4 are identified by identical reference numerals, and a duplication of descriptive matter relating to such elements is dispensed with. In the system of Figure 4 a triode drive tube 44 is employed ot drive the Miller effect capacitor pentode 21. The suppressor grid 23 of the latter is connected to its tube cathode, in conventional fashion. The cathode of pentode 21 is connected to ground via an unbypassed resistance 45, connected in series with a similar resistance 46 in series with the cathode of triode 44. The control grid triode 44 is then subjected to modulating voltage at terminal 47. The anode of triode 44 may be in series with a loading resistance 48, and may be grounded for A. C. voltage by means of a capacitor 49. In operation, the modulating signal applied to terminal 47 developes a voltage across resistance 45, which is transferred to the cathode of pentode 30, and serves to varying the gain of the latter, and thus the Miller effect capacitance available at its input grid 21.

A primary field of utility for the present invention resides in the production of vibrato effects in electronic tone generating musical instruments. For this use, smoothly continuous phase shift variation with modulating signal amplitude is desirable, and abrupt shifts undesirable, over a relatively large range of phase shifts, and at low modulated and modulating frequencies. The circuits of the present invention have been found to provide pleasing vibrato effects, for frequencies within the musical range.

While I have described and illustrated one specific embodiment of my invention, it will be clear that variations of the general arrangement and of the details of construction which are specifically illustrated and described may be resorted to without departing from the true spirit and scope of the invention.

What I claim is:

1. A phase modulator, comprising a resistance, a device having capacitance, said device including an electronic amplifier having an input circuit, said input circuit having capacitance of magnitude determined by the gain of said electronic amplifier, means for varying said gain of said electronic amplifier in response to a control signal, a source of input signal to be phase modulated, means for applying said input signal in parallel to said resistance and said device having capacitance, means for developing control voltages representative of current flow in said resistance and capacitance, respectively, and a symmetrical differential amplifier circuit for differentially combining said control voltages.

2. A phase modulator, comprising a pair of first input terminals for signal to be phase modulated, one of said first input terminals being at reference potential, a pair of second input terminals for modulation signals, one of said second input terminals being at said reference potential, means connecting said first input terminals in parallel with a first resistance and with a circuit including a second resistance and an electronically controllable capacitance in series with said second resistance, means responsive to said modulation signals for smoothly varying said electronically controllable capacitance, and means for differentially combining equal increments of voltage taken from said first and second resistances, respectively, to provide a phase modulated resultant.

3. The combination in accordance with claim 2 wherein said electronically controllable capacitance is a Miller-effect capacitance.

4. The combination in accordance with claim 2 wherein said electronically controllable capacitance is included in an input grid circuit of an electronic vacuum amplifier tube, and wherein said controllable capacitance is variable in accordance with the gain of said electronic vacuum amplifier tube.

5. The combination in accordance with claim 4 wherein said electronic vacuum amplifier tube is a pentode including a suppressor grid and a cathode and wherein said suppressor grid corresponds with said input grid.

6. A phase modulator, comprising a first resistance, a second resistance, an electronically variable capacitor, means connecting said first resistance, said second resistance and said electronically variable capacitor in series, means applying a first signal in series between a point of reference potential and the junction of said first and second resistances, a balanced differential amplifier including a first and a second vacuum tube each having an anode, a cathode and a grid, a common unbypassed cathode resistance in series between said cathode and said point of reference potential, substantially equal separate resistive loads for said anodes, a connection between the grid of said first vacuum tube and a point of said first resistance, a connection between the grid of said second vacuum tube and a point of said second resistance, and means for deriving phase modulated signal from the anode of one only of said vacuum tubes.

7. A phase modulator, comprising a first resistance having one end connected to a point of reference potential, a second resistance having one end joined to the other end of said first resistance to provide a signal input junction, an electronically variable capacitor connected between the other end of said second resistance and said point of reference potential, a source of A.-C. signal connected between said signal input junction and said point of reference potential, a balanced differential amplifier having two carrier source electrodes, two carrier control electrodes and two output electrodes, an unbypassed resistance connected jointly between said carrier source electrodes and said point of reference potential, co-phasal connections between each of said carrier control electrodes and a different one of said resistances, and means for deriving output signal from one only of said output electrodes.

8. A phase modulator comprising a series loop including a first resistance, a second resistance and a Miller-effect capacitance in series, in the recited order, means for inserting a signal to be phase modulated across said first resistance, unilateral control devices having two common electrodes, two control electrodes and two output electrodes, means responsive to voltage developed across said first resistance for varying the potential between one of said common and one of said control electrodes, means responsive to voltage developed across said second resistance for varying the potential between the others of said common and control electrodes, means for deriving an output voltage from one of said output electrodes, and means for varying the capacitance value of said Miller-effect capacitance.

9. A phase modulator comprising a closed loop consisting of a first resistance, a second resistance and a voltage responsive capacitance, a source of signal to be phase modulated, means connecting said source of signal to be modulated across said first resistance, a balanced symmetrical differential amplifier for substractively combining the voltage across at least part of said first resistance with the voltage across at least part of said second resistance, and means for deriving output signal from said balanced symmetrical differential amplifier.

10. A phase modulator, comprising a source of time varying voltage of unvarying phase, a source of time varying voltage of variable phase, a source of modulating signal, an electronic modulator responsive to said modulating signal for translating said time varying voltage of unvarying phase into said time varying voltage of variable phase varying smoothly in accordance with said modulating signal, a differential amplifier having first and second input circuits, means for applying said time varying voltage of unvarying phase to said first input circuit, means for applying said time varying voltage of phase varying smoothly in accordance with said modulating signal to said second input circuit, and a single ended output circuit coupled to said differential amplifier, said first and second input circuits consisting essentially of impedances of the same type.

References Cited in the file of this patent

UNITED STATES PATENTS 2,563,964 Schlang ---------------- Aug. 14, 1951